United States Patent
Filippov et al.

(10) Patent No.: US 10,392,905 B2
(45) Date of Patent: Aug. 27, 2019

(54) OPTIMIZING FLOW CONTROL DEVICE PROPERTIES FOR ACCUMULATED LIQUID INJECTION

(71) Applicant: Landmark Graphics Corporation, Houston, TX (US)

(72) Inventors: Andrey Filippov, Houston, TX (US); Jianxin Lu, Bellaire, TX (US); Vitaly Khoriakov, Calgary (CA)

(73) Assignee: Landmark Graphics Corporation, Houston, TX (US)

( * ) Notice: Subject to any disclaimer, the term of this patent is extended or adjusted under 35 U.S.C. 154(b) by 251 days.

(21) Appl. No.: 15/033,590

(22) PCT Filed: Nov. 15, 2013

(86) PCT No.: PCT/US2013/070400
§ 371 (c)(1),
(2) Date: Apr. 29, 2016

(87) PCT Pub. No.: WO2015/073031
PCT Pub. Date: May 21, 2015

(65) Prior Publication Data
US 2016/0273316 A1    Sep. 22, 2016

(51) Int. Cl.
*E21B 41/00* (2006.01)
*E21B 43/16* (2006.01)
*G05B 13/04* (2006.01)
*E21B 43/12* (2006.01)
*E21B 43/20* (2006.01)

(52) U.S. Cl.
CPC .......... *E21B 41/0092* (2013.01); *E21B 43/12* (2013.01); *E21B 43/162* (2013.01); *G05B 13/041* (2013.01); *E21B 43/20* (2013.01)

(58) Field of Classification Search
CPC ... G05B 19/416; G05B 13/041; E21B 43/162; E21B 41/0092; E21B 43/20; E21B 43/16; E21B 43/12
See application file for complete search history.

(56) References Cited

U.S. PATENT DOCUMENTS

| 4,676,313 A * | 6/1987 | Rinaldi | E21B 43/12 166/250.15 |
|---|---|---|---|
| 2002/0049575 A1 | 4/2002 | Jalali et al. | |

(Continued)

FOREIGN PATENT DOCUMENTS

| WO | WO-9902819 A1 | 1/1999 |
| WO | WO-2015016932 A1 | 2/2015 |
| WO | WO-2015073030 A1 | 5/2015 |

OTHER PUBLICATIONS

Ellis et al., "Inflow Control Devices—Raising Profiles", Oilfield Review (Winter 2009/2010): pp. 30-27 (from website https://www.slb.com/~/media/Files/resources/oilfield_review/ors09/win09/03_inflow_control_devices.pdf).*

(Continued)

*Primary Examiner* — Michele Fan (57) ABSTRACT

The disclosed embodiments include a computer implemented method, apparatus, and computer program product that includes executable instructions that when executed performs operations for determining flow control device properties for an injection well that would yield to a prescribed uniform or non-uniform accumulated injection profile along a production well.

20 Claims, 5 Drawing Sheets

(56) References Cited

U.S. PATENT DOCUMENTS

| | | | | |
|---|---|---|---|---|
| 2006/0048942 | A1* | 3/2006 | Moen | E21B 43/12 166/306 |
| 2011/0000684 | A1* | 1/2011 | Charles | E21B 43/12 166/386 |
| 2011/0042083 | A1* | 2/2011 | Sierra | E21B 43/12 166/271 |
| 2011/0309835 | A1 | 12/2011 | Barber et al. | |
| 2012/0016649 | A1* | 1/2012 | Thambynayagam | E21B 43/12 703/10 |
| 2012/0278053 | A1 | 11/2012 | Garcia et al. | |
| 2013/0173166 | A1* | 7/2013 | Badri | G01V 7/06 702/12 |
| 2014/0054032 | A1* | 2/2014 | Affholter | E21B 43/24 166/272.6 |

OTHER PUBLICATIONS

Abllah et al., "Application of Inflow Control Valve (ICV) in the Water Injector Well: Case Study on Alpha Field", SPE International (2011): pp. 1-14.*

Amaral et al., "Equalization of Water Injection Profile of a Subsea Horizontal Well: A Case History", SPE International (2008): pp. 1-6.*

Minulina et al., "The Design, Implementation and Use of Inflow Control Devices for Improving the Production Performance of Horizontal Wells", SPE International (2012): pp. 1-15.*

Kyanpour et al., "A New Approach for Designing Steam Splitters and Inflow Control Devices in Steam Assisted Gravity Drainage", SPE International (2013): pp. 1-14.*

Rahimah et al., "Horizontal Well Optimization With Inflow Control Devices (ICDs) Application in Heterogeneous and Dipping Gas-Capped Oil Reservoirs", SPE International (2010): pp. 1-15.*

International Search Report and Written Opinion, dated Aug. 14, 2014, 12 pages, Korean Intellectual Property Office.

Su, Ho-Jeen and Dogru, Ali H., Modeling of Equalizer Production System and Smart-Well Applications in Full-Field Studies, 2007 SPE/EAGE Reservoir Characterization and Simulation Conference, Oct. 28-31, 2007, 11 pages, SPE 111288, Society of Petroleum Engineers, Abu Dhabi, UAE.

Sarma, P. and Aziz,K., Implementation of Adjoint Solution for Optimal Control of Smart Wells, 2005 SPE Reservoir Simulation Symposium, Jan. 31, 2005-Feb. 2, 2005, 17 pages, SPE 92864, Society of Petroleum Engineers, Houston, Texas.

Sharma, A., Kok, J.C., Neuschaefer R., Han, S.Y., Bieltz, T., Obvintsev A. and Riegler, P., Integration of Dynamic Modeling of ICD Completion Design and Well Placement Technology: A Case Study of GOM Shelf Reservoir, SPE Annual Technical Conference and Exhibition, Oct. 30-Nov. 2, 2011, 12 pages, SPE 146454, Society of Petroleum Engineers, Denver, Colorado.

Thornton, Kim, Jorquera, Ricardo and Soliman, M.Y., Optimization of Inflow Control Device Placement and Mechanical Conformance Decisions Using a New Coupled Well-Intervention Simulator, Nov. 11-14, 2012, 13 pages, SPE 162471, Society of Petroleum Engineers, Abu Dhabi, UAE.

Kaiser, T.M.V. Wilson, S. and Venning, L.A., Inflow Analysis and Optimization of Slotted Liners, Nov. 6-8, 2000, 12 pages, SPE 65517, Society of Petroleum Engineers, Calgary, Alberta, Canada.

Yeten, Burak, Durlofsky, Louis J. and Aziz, Khalid, Optimization of Smart Well Control, Nov. 4-7, 2002, 10 pages, SPE 79031, Society of Petroleum Engineers, Calgary, Alberta, Canada.

* cited by examiner

OPTIMIZING FLOW CONTROL DEVICE PROPERTIES FOR ACCUMULATED LIQUID INJECTION

CROSS-REFERENCE TO RELATED APPLICATIONS

This application is a U.S. national stage patent application of International Patent Application No. PCT/US2013/070400, filed on Nov. 15, 2013, the benefit of which is claimed and the disclosure of which is incorporated herein by reference in its entirety.

BACKGROUND OF THE INVENTION

1. Field of the Invention

The present disclosure relates generally to the recovery of subterranean deposits and more specifically to methods and systems for optimizing the placement and other properties of one or more flow control devices along a liquid injection well for the purpose of improving recovery from a reservoir.

2. Discussion of the Related Art

Liquid injection refers to the method in the oil industry where fluid (usually water) is injected into the reservoir, to increase pressure and stimulate production. For example, in certain instances, the water replaces the oil which has been taken, thus, keeping the production rate and the pressure the same over the long term. In addition, in certain situations, the water displaces or sweeps oil from the reservoir and pushes it towards a well. Liquid injection wells can be found both on and off shore to increase oil recovery from an existing reservoir.

However, liquid injection wells frequently suffer from imbalanced placement of the injected fluid due to one or more of the zones accepting excessive injection rates and volume. The primary reason for this is permeability differences or thief zones along the well bore. With imbalances in the injection rates, problems can arise including ineffective reservoir drainage and early breakthrough of injected fluid into producers. Thus, solutions are needed to overcome the imbalanced placement of the injected fluid.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

As stated above, liquid injection wells frequently suffer from imbalanced placement of the injected fluid due to one or more of the zones accepting excessive injection rates and volume. In accordance with the disclosed embodiments, one method to counter this imbalance is to use one or more flow control devices along the injection well to balance the fluid injected into the formation. As referenced herein, a flow control device (FCD) is any device that is coupled to a wellbore that causes a pressure drop between the wellbore and a reservoir to reduce flow between the wellbore and the reservoir at the location of the flow control device. For instance, in certain embodiments, an inflow control device (ICD), as known in the art, may be used in connection with an injection well to balance the fluid injected into the formation. In this case, the ICD would act as an injection control device, as opposed to an inflow control device, as it would perform the reverse action of controlling flow of the injected fluid from the base pipe to the annulus. A non-limiting example of a flow control device in accordance with the disclosed embodiments is the EquiFlow® Inject system available from Halliburton®.

To improve hydrocarbon recovery the completion design must account for the drawdown from heel to toe, locations of other wells, and reservoir heterogeneity. In addition, for optimal productivity, the FCD design needs to be linked to a model accounting for the physical characteristics of the reservoir and wellbore. Additionally, the model must predict the time-dependent expansion dynamics of the injected liquid volume.

However, to date, no easy methods for determining the proper placement or selection of flow control devices or for predicting the time-dependent expansion dynamics of the injected liquid volume have been developed. Instead, current methods rely on a manual trial and error process in which various sizing/types and placement of flow control devices are simulated along a horizontal well using simulation software such as NETool™ available from Landmark Graphics Corporation.

Therefore, in accordance with the disclosed embodiments, a numerical method and a simulation algorithm are proposed for calculating the optimal FCD placement and other properties (e.g., number of holes and hole sizes, and/or number and types of FCDs), which would yield a uniform or prescribed accumulated injection profile along the wellbore. The disclosed embodiments will be illustrated by an example utilizing a simplified coupled tank reservoir-wellbore hydrodynamic model which accounts for FCD effects on the liquid behavior in the injector well and formation. The disclosed embodiments and methodology can be applied to coupled reservoir-wellbore models of varying levels of complexity.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Figure 1:
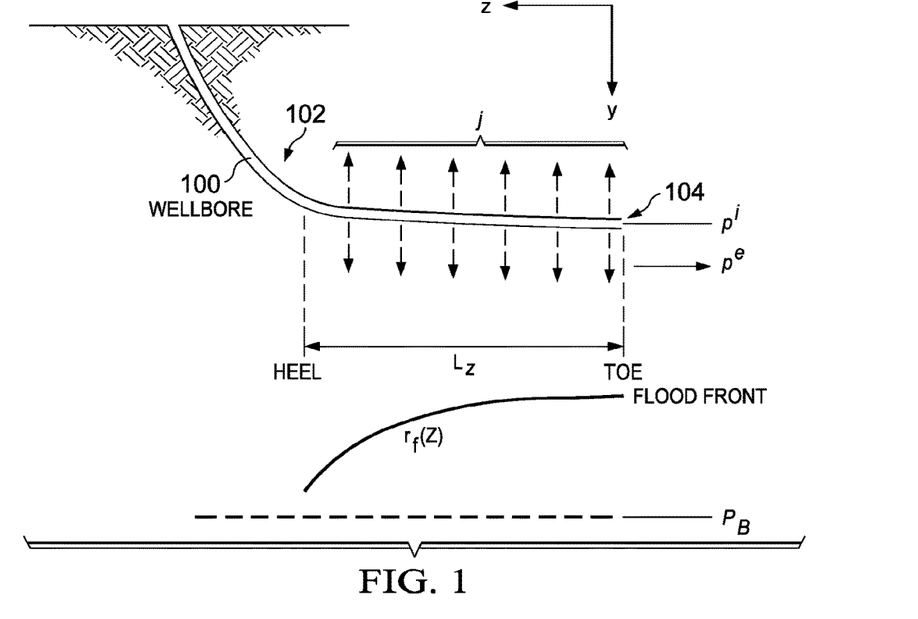
FIG. 1 is a diagram depicting a typical scheme of a horizontal injection well in accordance with the disclosed embodiments.

Beginning with FIG. 1, a diagram depicting a typical scheme of a horizontal injection well 100 is presented. The injection well 100 includes an upstream end 102 and downstream end 104. The upstream end 102 is known in the art as the heel of the well and the downstream end 104 is known as the toe. In addition, several parameters described herein are also indicated on FIG. 1. In particular, z is the horizontal coordinate; $L_z$ is the wellbore length; $P_i$ is the wellbore pressure, $P_e$ is the annulus pressure, $P_B$ is the reservoir boundary pressure, j is the volumetric flow rate of injected liquid per unit length of the wellbore (e.g., number of gallons per meter).

Figure 2:
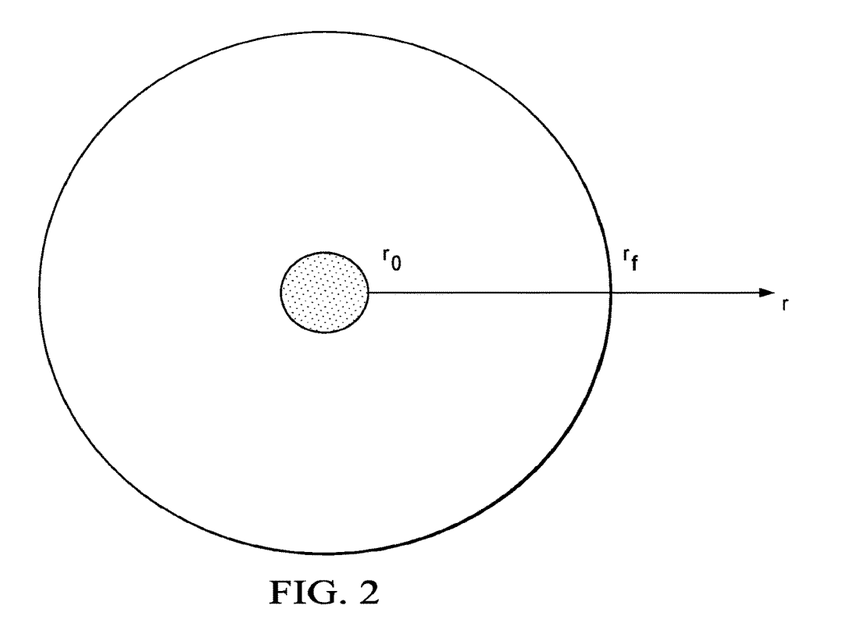
FIG. 2 is a diagram indicating an example of the geometry of the boundary of an injected liquid volume in relation to an injection well in accordance with a disclosed embodiment.

FIG. 2 is a diagram indicating an example of the geometry of a boundary of an injected liquid volume $r_f$ in relation to the injection well 100 in accordance with a disclosed embodiment. The shape of the boundary of injected volume is axially symmetric and is described by the function $r=r_f(z, t)$. This boundary can be considered a moving front, separating injected liquid volume $r<r_f(z, t)$ from oil in the formation, as shown in FIG. 2. The pressure distribution inside and outside of the injected volume is quasi-steady and described by equations:

$$r < r_f: p = p_i + \frac{(p_f - p_i^{ex})}{\ln\left(\frac{r_f}{r_0}\right)}\ln\left(\frac{r}{r_0}\right) \quad \text{(Equation 1)}$$

$$r > r_f: p = p_f + \frac{(p_B - p_f)}{\ln\left(\frac{r_B}{r_f}\right)}\ln\left(\frac{r}{r_f}\right) \quad \text{(Equation 2)}$$

where $r_B$ and $r_o$ are the radial coordinates of the reservoir boundary and the wellbore surface (sandface), $P_B$ is the pressure at reservoir boundary, $p^{ex}_i$ is the pressure at the wellbore surface and $p_f$ is the pressure at the front.

In one embodiment, due to low compressibility of liquids involved, the volumetric flow rate of the injected liquid $J_i$ and oil $J_p$ at the front can be considered the same:

$$J_i = J_p \quad \text{(Equation 3)}$$

$$J_i = -\frac{2\pi k_0 k'_i}{\mu_i}\frac{(p_f - p_i^{ex})}{\ln\left(\frac{r_f}{r_0}\right)};$$

$$J_p = -\frac{2\pi k_0 k'_p}{\mu_p}\frac{(p_B - p_f)}{\ln\left(\frac{r_B}{r_f}\right)}$$

where $k_0$ is the absolute permeability of the formation, $k'_i$ and $k'_p$ are the relative permeabilities of injected fluid and oil, respectively and $\mu_i$ and $\mu_p$ are the viscosities of these liquids. The relative permeabilities depend on the saturation of the rock with original and injected liquids. Combining the equations (3) yields the following expression for the injected flux:

$$J_i = \frac{2\pi \frac{k_0 k'_i}{\mu_i}(p_i^{ex} - p_B)}{\ln\left(\frac{r_f}{r_0}\right) + \gamma\ln\left(\frac{r_B}{r_f}\right)}; \quad \text{(Equation 4)}$$

$$\gamma = \frac{k'_p \rho_p \mu_{in}}{k'_i \rho_i \mu_p}$$

The flow of liquid in the wellbore is described by the following coupled equations:

$$\frac{dq_i}{dz} = \rho_i J_i; \quad \text{(Equation 5)}$$

$$q_i = \rho_i V_i A$$

$$\frac{dp_i}{dz} = -\frac{1}{2D_i} f_d \rho_i V_i^2 \quad \text{(Equation 6)}$$

$$\frac{dr_f}{dt} = \frac{J_i}{2\pi\varphi\Delta S_i}\frac{1}{r_f} \quad \text{(Equation 7)}$$

Equation 5 is the continuity equation, which mathematically expresses the principle of conservation of mass (i.e., mass is neither created nor destroyed). Equation 6 is the momentum balance equation, which requires that any change in momentum of the liquid in the wellbore equals the applied force. Equation 7 describes the propagation velocity of the front.

In the above equations, $p_i$ is the pressure inside the wellbore, $q_i$ is the mass flow rate of injection liquid in the wellbore, $p_i$ is injection liquid density, $V_i$ is the average flow velocity, A is the inner cross-section area of the wellbore, $\Delta S_i$ is the change of saturation of the injected liquid at the displacement front, and $f_d$ is the Darcy friction coefficient, which accounts for friction loss in pipe flow as well as open channel flow. In one embodiment, the Darcy friction factor is determined using the Haaland equation as shown below in Equations 8 and 9. Other equations such as, but not limited to, Colebrook-White equation, Swamee-Jain equation, and Goudar equation may also be used to determine the Darcy friction factor in accordance with the disclosed embodiments.

$$\text{Re} = \frac{\rho V D}{\mu}, \quad \text{(Equation 8)}$$

where Re is the Reynolds number.

$$f_d = \begin{cases} 64/\text{Re}, & \text{if Re} < 2300; \\ \left\{-1.8\log_{10}\left[\left(\frac{\varepsilon/D}{3.7}\right)^{10/9} + \frac{6.9}{\text{Re}}\right]\right\}^{-2}, & \text{if Re} > 2300. \end{cases} \quad \text{(Equation 9)}$$

Equations 10 and 11 (below) describes the pressure drop across the FCD for a given injection flow rate $J_i$.

$$J_i^2 = \sigma f(z)(p_i - p_i^{ex}) \quad \text{(Equation 10)}$$

$$f(z) = \left(\frac{s_{or}}{s_{or}^0}\frac{L_{or}}{L_{or}^0}\right)^2; \quad \text{(Equation 11)}$$

$$\sigma = \frac{2}{\rho_i}\left(\frac{Cs_{or}^0}{L_{or}^0}\right)^2;$$

where C is orifice flow coefficient, $s_{or}$ is the cross-section area of the nozzle, $L_{or}$ is the spacing of the nozzles along the pipe, while superscript $^0$ denotes the default size and nozzle spacing.

Function $f(z)$ characterizes the longitudinal variation of hole diameter or linear density of FCDs. Increase of $f(z)$ results in reduction the pressure drop across the FCD wall and therefore increasing the influx of reservoir fluids. Combining Equations 4 and 11 yields:

$$p_i - p_B = \frac{J_i^2}{\sigma f(z)} + \frac{J_i}{B}, \quad \text{(Equation 12)}$$

$$B = \frac{2\pi k_0 k_i'}{\mu_i} \frac{1}{\ln\left(\frac{r_f}{r_0}\right) + \gamma\ln\left(\frac{r_B}{r_f}\right)}$$

As stated above, the disclosed embodiments propose the use of a numerical method and a simulation algorithm for calculating the optimal FCD placement and other properties, characterized by function $f(z)$ as described above, which yields to a prescribed shape of the injection front, characterized by given function $r_f=F(z)$.

Figure 3:
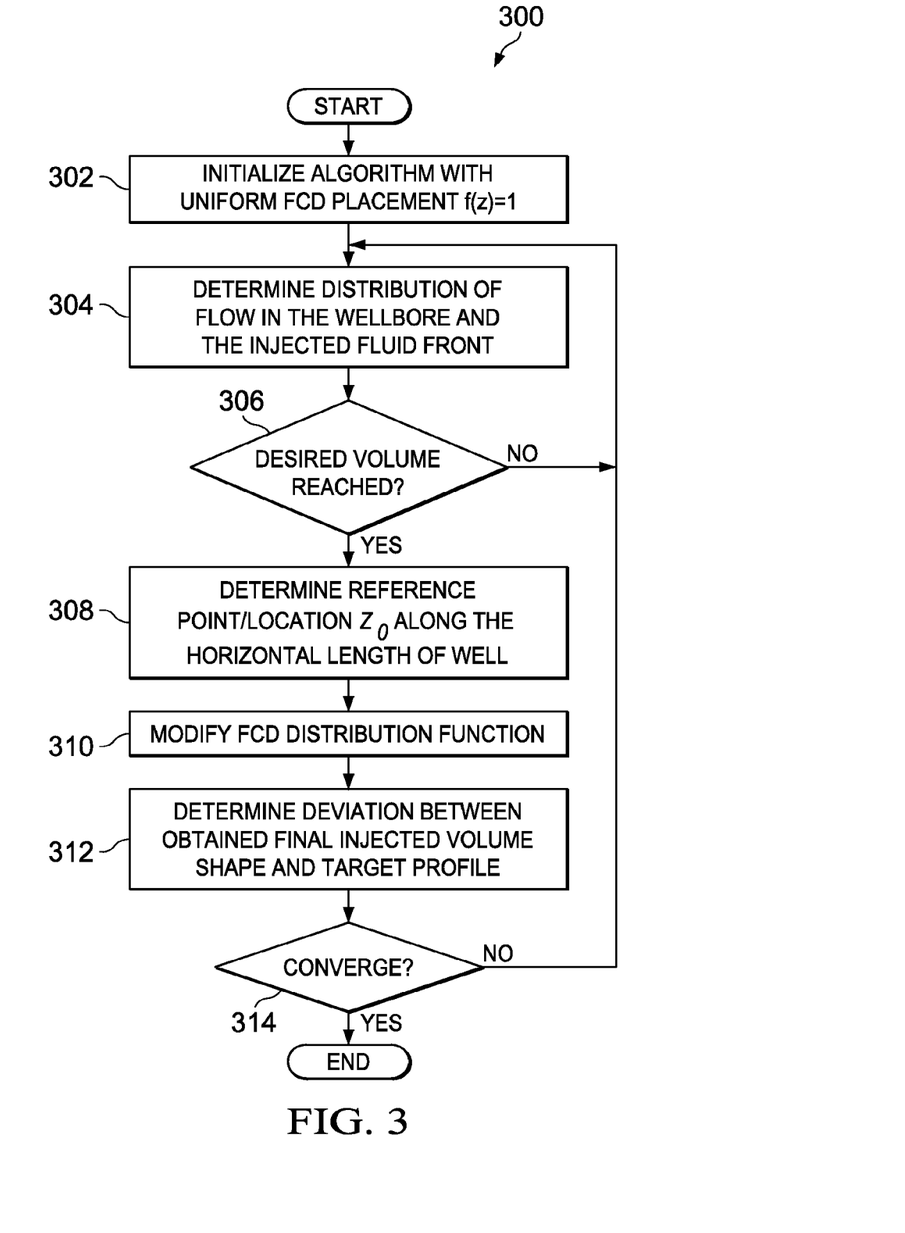
FIG. 3 is a flowchart depicting an example of computer-implemented method for determining the optimum flow control device properties that yields to a prescribed shape of the injection front in accordance with the disclosed embodiments.

For example, FIG. 3 illustrates a flowchart depicting an example of computer-implemented method 300 for determining the optimum flow control device properties for an injection well that yields to a prescribed shape of the injection front in accordance with the disclosed embodiments. The process 300 begins at step 302 by using an initial uniform FCD placement in accordance with Equation 13.

$$f(z) = f_0(z) = 1; \quad 0 \le z \le L_z \quad \text{(Equation 13)}$$

At step 304, the process determines the distribution of flow in the wellbore and the injected fluid front. For instance, in one embodiment, the distribution of flow in the wellbore is determined using Equations 5 and 6 as described above, while the evolution of the displacement fluid front $r_f(z,t)$ is determined using Equation 7.

The process at step 306 determines whether the current injected volume has reached the desired volume of injection fluid $V_0$. If the current injected volume has not reached the desired volume of injection fluid $V_0$, the process repeats step 304. In other words, the time integration stops at time $t=t_m$ when the condition $$\pi\int_0^L [r_f^n(z, t_m)]^2 dz = V_0 \quad \text{(Equation 14)}$$

is fulfilled (i.e., the desired volume of injection fluid $V_0$ has been reached), where n is the iteration number and $V_0$ is a given injection volume:

$$V_0 = \pi\int_0^{L_z} F^2(z) dz \quad \text{(Equation 15)}$$

If the current injected volume has reached the desired volume of injection fluid $V_0$, the process at step 308 determines a point/location $z_0$ along the horizontal production length of the wellbore that satisfies the following condition/equation:

$$\frac{r_f^1(z_0, t_m)}{F(z_0)} = \min\left[\frac{r_f^1(z, t_m)}{F(z)}\right]; \quad \text{(Equation 16)}$$

$$0 \le z \le L_z$$

In other words, $z_0$ is the point along the length of the wellbore $L_z$ that has the minimum ratio between the current fluid injection front $r_f^1 (z_0, t_m)$ and the desired/target fluid injection front F $(z_0)$.

In one embodiment, the point $z_0$ and the corresponding value of the FCD distribution function $f(z_0)$ remains fixed for all of the following iterations:

$$f_n(z_0)=1; n=1,2, \quad \text{(Equation 17)}$$

where n is the iteration number.

At step 310, based on the results of step 304, the process modifies the FCD distribution function by increasing values of the FCD distribution function at points where the front $r_f^n$ is not sufficiently advanced compared to the target F(z) and decreases at the points of the overshoot where $r_f^n$>F(z). For example, in one embodiment, the process uses the following equation for performing the adjustment:

$$f^{n+1}(z) = \left[\frac{r_f^n(z_0, t_m)}{F(z_0)} \frac{F(z)}{r_f^n(z, t_m)}\right]^4 f^n(z) \quad \text{(Equation 18)}$$

The process at step 312, determines the deviation/difference A between the obtained final injected volume shape and the target profile.

$$\Delta = \pi\int_0^L [r_f^n(z,t_m)-F(z)]^2 dz \quad \text{(Equation 19)}$$

At step 314, the process determines whether the deviation is within a predetermined convergence value (i.e., $\Delta<\varepsilon V_0$). For example, in one embodiment, the $\varepsilon$ is of order $10^{-5}$. If the deviation is not within the predetermined convergence value, the process returns to step 302 and repeats the disclosed process. However, if the deviation is within the predetermined convergence value, then process determines that the corresponding function $f^{n+1}(z)$ yields the optimized FCD properties, with process 300 terminating thereafter.

To help further describe the disclosed embodiments, FIGS. 4-7 illustrate four examples that demonstrate how the disclosed embodiments can be applied in various practical situations. The conditions for these four examples are listed in Table 1 below. In the given examples, it is assumed that the horizontal injection well has a diameter 0.15 m and a length 2500 m. Water was chosen as the injection fluid with viscosity $10^{-3}$ Pa s, while the reservoir absolute permeability is set to 0.5 Darcy. The FCD base hole diameter $D_{or}$ is 3 mm with spacing $L_{or}$ equal to 12 m. The reservoir boundary pressure $p_B$ is set as a constant value. In the depicted examples, instead of using the wellbore pressure $P_i$, the pressure drawdown from wellbore to reservoir $(p_i-p_B)$ is calculated using a variable function. One of ordinary skill in the art would recognize that the disclosed embodiments are not limited to the above example parameters and may vary depending on the actual parameters of a particular well.

TABLE 1

Condition settings for the four examples

| Example | Water/oil permeability | Targeted water front profile |
| --- | --- | --- |
| 1 | Homogenous | Uniform |
| 2 | Step wise | Uniform |
| 3 | Parabolic | Uniform |
| 4 | Homogenous | Parabolic |

In the depicted examples, the algorithm is configured to assume that the relative permeabilities of oil and water k' are constant before and after the displacement front while experiencing jumps at the front location. The total permeability may still vary due to the local rock properties. In examples 1 and 4, the absolute permeability and relative permeabilities are set to a fixed value everywhere. In contrast, in examples 2 and 3, the absolute permeability varies in axial direction. For instance, in examples 2 and 3, a step function and a parabolic function represent the heterogeneity of the absolute permeability.

Figure 4:
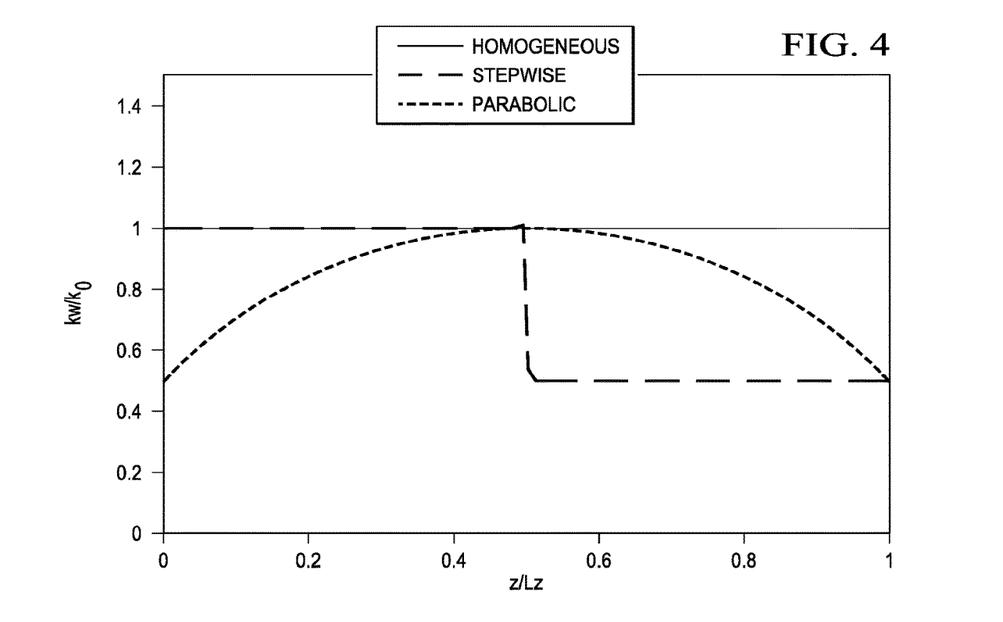
FIG. 4 is a diagram that illustrates an example of a graph that depicts reservoir permeability variation along a wellbore in accordance with the disclosed embodiments.

The distributions of the reservoir permeability variation along the wellbore for the four examples are plotted in FIG. 4. The position z/Lz=0 is the heel of the wellbore and z/Lz=1 is the toe of the wellbore.

Figure 5:
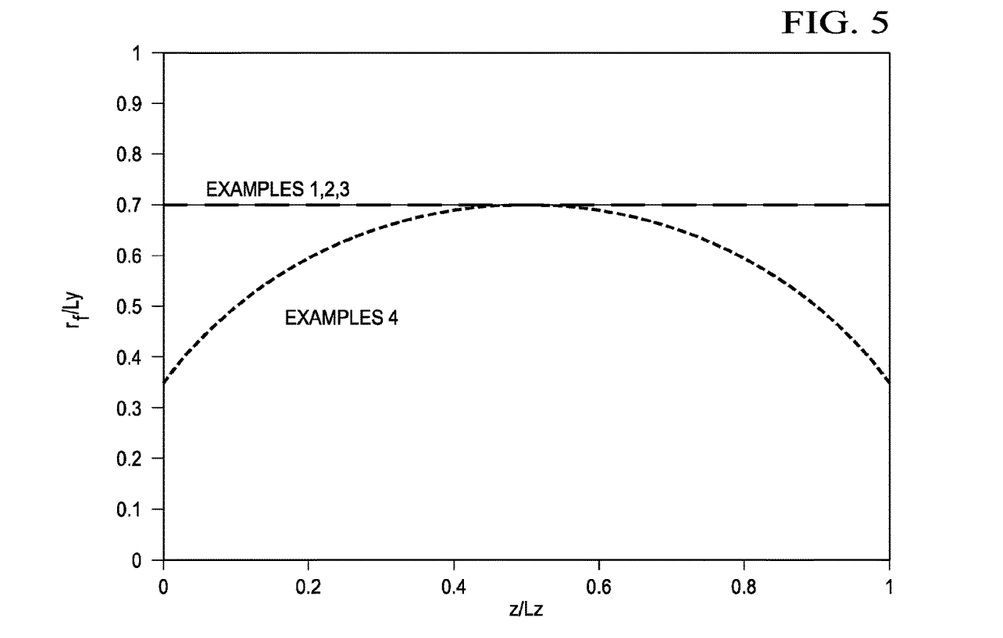
FIG. 5 is a diagram that illustrates an example of a graph that depicts a water front profile along a wellbore in accordance with the disclosed embodiments.

FIG. 5 illustrates the final water injected profile along the wellbore for the four examples. In the simulated examples, the water front positions have excellent convergence. The profiles of the first three cases (examples 1-3) overlap with each other, matching the desired uniform distribution. In example 4, the water front yields a targeted parabolic profile.

Figure 6:
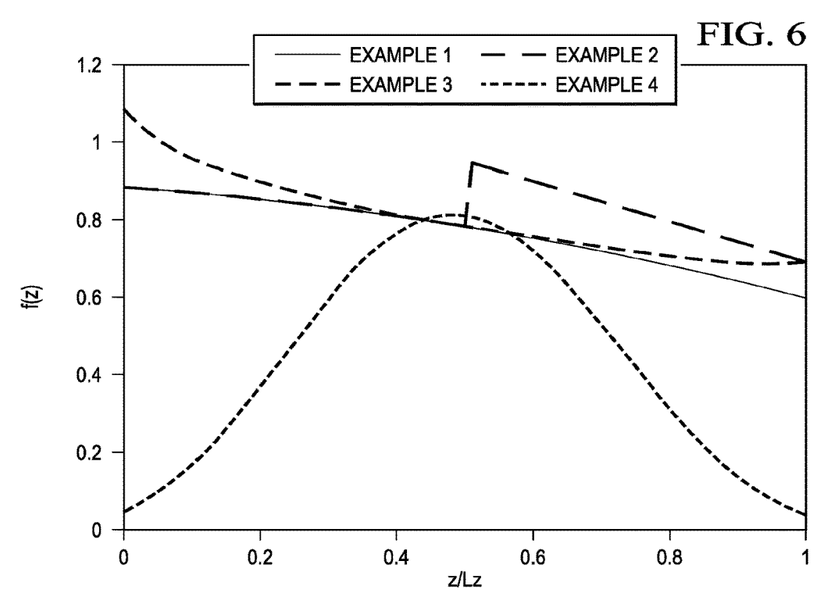
FIG. 6 is a diagram that illustrates an example of a graph that depicts the optimal flow control device flow penetration functions $f(z)$ which yield the desired cumulative water injection profiles in accordance with the disclosed embodiments.
Figure 7:
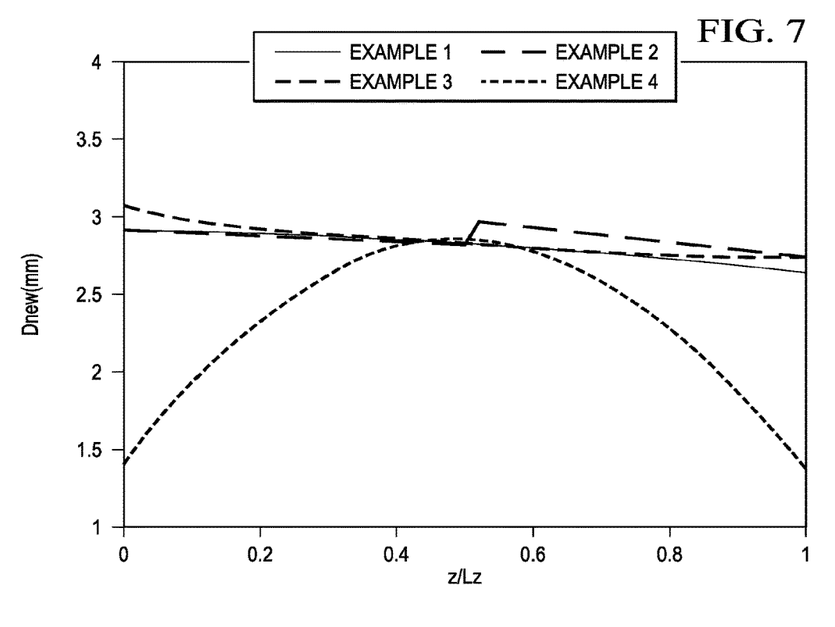
FIG. 7 is a diagram that illustrates an example of a graph that depicts the optimal flow control device nozzle size distributions in accordance with the disclosed embodiments.

FIG. 6 illustrates the optimal FCD distribution functions obtained by numerical iterations. In the simulated examples, all the iterations converge in less than ten steps. If the FCDs are placed equidistantly along the wellbore, the resulting distribution function f(z) yields the required FCD diameter distribution using the below equation 20, which follows from Equation 11. FIG. 7 illustrates the optimal FCD nozzle size\hole diameter distributions for examples 1-4.

$$D_{new}=[f'(Z)]^{1/4}D_{or} \quad \text{(Equation 20)}$$

Figure 8:
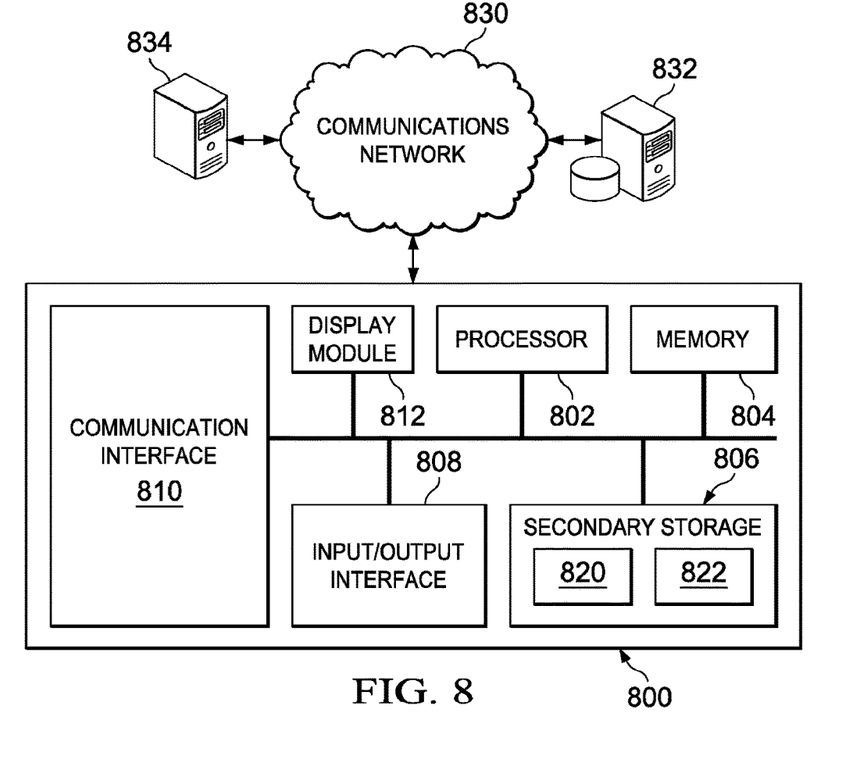
FIG. 8 is a block diagram illustrating one embodiment of a system for implementing the disclosed embodiments.

Referring now to FIG. 8, a block diagram illustrating one embodiment of a system 800 for implementing the features and functions of the disclosed embodiments is presented. The system 800 may be any type of computing device including, but not limited to, a desktop computer, a laptop, a server, a mainframe, a tablet, and a mobile device. The system 800 includes, among other components, a processor 802, memory 804, secondary storage unit 806, an input/output interface module 808, and a communication interface module 810.

The processor 802 may be any type microprocessor including single core and multi-core processors capable of executing instructions for performing the features and functions of the disclosed embodiments. The input/output interface module 808 enables the system 800 to receive user input (e.g., from a keyboard and mouse) and output information to one or more devices such as, but not limited to, printers, external data storage devices, and audio speakers. The system 800 may optionally include a separate display module 812 to enable information to be displayed on an integrated or external display device. For instance, the display module 812 may include instructions or hardware (e.g., a graphics card or chip) for providing enhanced graphics, touchscreen, and/or multi-touch functionalities associated with one or more display devices.

Memory 804 is volatile memory that stores currently executing instructions/data or instructions/data that are prefetched for execution. The secondary storage unit 806 is non-volatile memory for storing persistent data. The secondary storage unit 806 may be or include any type of data storage component such as a hard drive, a flash drive, or a memory card. In one embodiment, the secondary storage unit 806 stores the computer executable code/instructions and other relevant data for enabling a user to perform the features and functions of the disclosed embodiments.

For example, in accordance with the disclosed embodiments, the secondary storage unit 806 may permanently store executable code/instructions 820 for performing the above-described flow control device optimization process. The instructions 820 associated with the flow control device optimization process are then loaded from the secondary storage unit 806 to memory 804 during execution by the processor 802 for performing the disclosed embodiments. In addition, the secondary storage unit 806 may store other executable code/instructions and data 822 such as, but not limited to, a wellbore simulator application and/or a reservoir simulation application for use with the disclosed embodiments.

The communication interface module 810 enables the system 800 to communicate with the communications network 830. For example, the network interface module 808 may include a network interface card and/or a wireless transceiver for enabling the system 800 to send and receive data through the communications network 830 and/or directly with other devices.

The communications network 830 may be any type of network including a combination of one or more of the following networks: a wide area network, a local area network, one or more private networks, the Internet, a telephone network such as the public switched telephone network (PSTN), one or more cellular networks, and wireless data networks. The communications network 830 may include a plurality of network nodes (not depicted) such as routers, network access points/gateways, switches, DNS servers, proxy servers, and other network nodes for assisting in routing of data/communications between devices.

For example, in one embodiment, the system 800 may interact with one or more servers 834 or databases 832 for performing the features of the disclosed embodiments. For instance, the system 800 may query the database 832 for well log information for creating a coupled wellbore-reservoir model in accordance with the disclosed embodiments. Further, in certain embodiments, the system 800 may act as a server system for one or more client devices or a peer system for peer to peer communications or parallel processing with one or more devices/computing systems (e.g., clusters, grids).

Accordingly, the disclosed embodiments provide a system and computer implemented method that is able to determine, using a numerical algorithm, the optimum FCD placements or other properties such as, but not limited to, hole diameter, that will yield a uniform or prescribed accumulated injection profile along a wellbore to prevent the premature breakthrough of injection fluid. For instance, the disclosed embodiments enable tailoring the shape of the displacement front thus yielding a desired injection profile.

One advantage of the disclosed embodiments is that it can be applied to coupled wellbore-reservoir simulations of various complexity levels. Another advantage is that the disclosed process is computationally efficient as it is optimized for a specific set of problems and is much simpler than a universal optimization method. In addition, the disclosed process exhibits an excellent convergence as it does not involve the Lagrange multipliers. Further, the disclosed process can be easily applied to any coupled wellbore-reservoir model, including the most complicated ones.

As stated above, a traditional approach for flow control device placement/optimization involves running multiple reservoir models and choosing the best design (which is usually good, but not optimal) from a set of simulations with different completion placements. In contrast, application of the disclosed embodiments would not only yield to the best placement/optimization design, but also substantially reduce the total computational effort.

In certain embodiments, the disclosed embodiments may be used to provide a very good initial guess for CPU-expensive simulations involving detailed 3D models (for example field reservoir simulations), thus saving days of simulation time. In one embodiment, the disclosed processes may be integrated into production simulation software package (e.g., NETool™). Moreover, the disclosed process is flexible enough to account for many physical phenomena and reservoir conditions that might be not captured by the reservoir simulator model but be seen in the formation from the log measurements. Additionally, in certain embodiments, vertical-horizontal anisotropy of permeabilities can be accounted for by using effective permeabilities.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed below.

Example 1 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 2 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well, wherein the reference location along the injection well satisfies the following condition of having a minimum ratio between a current fluid injection front and a target fluid injection front; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 3 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 4 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value, wherein the predetermined convergence value is $10^{-5}$ of the desired volume of injection fluid; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 5 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop, wherein the reference location along the length of the injection well does not change during subsequent iterations of the loop; and responsive to a determination that the deviation is within the predetermined convergence value, exiting the loop and determining the flow control device properties for the injection well that yields the prescribed accumulated injection profile along the production well.

Example 6 is a computer implemented method for determining flow control device properties for an injection well that would yield to a prescribed non-uniform accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 7 is a computer implemented method for determining flow control device properties for an injection well that would yield to a prescribed uniform accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 8 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a hole diameter distribution for the flow control devices along the length of the injection well.

Example 9 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a placement distribution for the flow control devices along the length of the injection well.

Example 10 is a computer implemented method for determining flow control device properties for an injection well that would yield to a prescribed accumulated injection profile along a production well, the method comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well that satisfies the condition of having a minimum ratio between a current fluid injection front and a target fluid injection front; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 11 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 12 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well, wherein the reference location along the injection well satisfies the following condition of having a minimum ratio between a current fluid injection front and a target fluid injection front; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 13 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 14 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value, wherein the predetermined convergence value is $10^{-5}$ of the desired volume of injection fluid; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 15 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop, wherein the reference location along the length of the injection well does not change during subsequent iterations of the loop; and responsive to a determination that the deviation is within the predetermined convergence value, exiting the loop and determining the flow control device properties for the injection well that yields the prescribed accumulated injection profile along the production well.

Example 16 is a system, comprising: at least one processor; and at least one memory coupled to the at least one processor and storing computer executable instructions for determining flow control device properties for an injection well that would yield to a prescribed non-uniform accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 17 is a system, comprising: at least one processor; and at least one memory coupled to the at least one processor and storing computer executable instructions for determining flow control device properties for an injection well that would yield to a prescribed uniform accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 18 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a hole diameter distribution for the flow control devices along the length of the injection well.

Example 19 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a placement distribution for the flow control devices along the length of the injection well.

Example 20 is a system, comprising: at least one processor; and at least one memory coupled to the at least one processor and storing computer executable instructions for determining flow control device properties for an injection well that would yield to a prescribed accumulated injection profile along a production well. The computer executable instructions comprises instructions for: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well that satisfies the condition of having a minimum ratio between a current fluid injection front and a target fluid injection front; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 21 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 22 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well, wherein the reference location along the injection well satisfies the following condition of having a minimum ratio between a current fluid injection front and a target fluid injection front; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 23 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 24 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value, wherein the predetermined convergence value is $10^{-5}$ of the desired volume of injection fluid; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 25 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop, wherein the reference location along the length of the injection well does not change during subsequent iterations of the loop; and responsive to a determination that the deviation is within the predetermined convergence value, exiting the loop and determining the flow control device properties for the injection well that yields the prescribed accumulated injection profile along the production well.

Example 26 is a non-transitory computer readable medium comprising computer executable instructions for determining flow control device properties for an injection well that would yield to a prescribed non-uniform accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 27 is a non-transitory computer readable medium comprising computer executable instructions for determining flow control device properties for an injection well that would yield to a prescribed uniform accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

Example 28 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a hole diameter distribution for the flow control devices along the length of the injection well.

Example 29 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well; adjusting the flow control device distribution function; determining a deviation between an injected volume profile and the prescribed accumulated injection profile; determining whether the deviation is within a predetermined convergence value; responsive to a determination that the deviation is not within the predetermined convergence value, repeating the loop; and responsive to a determination that the deviation is within the predetermined convergence value, exiting the loop and determining a placement distribution for the flow control devices along the length of the injection well.

Example 30 is a non-transitory computer readable medium comprising computer executable instructions for determining flow control device properties for an injection well that would yield to a prescribed accumulated injection profile along a production well. The computer executable instructions includes instructions that when executed causes one or more machines to perform operations comprising: initializing a flow control device distribution function to have a uniform flow control device distribution profile; executing a loop of instructions that perform operations comprising: determining, using the flow control device distribution function, a distribution of flow and an injected fluid front for a desired volume of injection fluid; determining a reference location along a length of the injection well that satisfies the condition of having a minimum ratio between a current fluid injection front and a target fluid injection front; adjusting the flow control device distribution function; determining a deviation between an injected volume profile and the prescribed accumulated injection profile, wherein adjusting the flow control device distribution function includes increasing values of the flow control device distribution function at points where the injected fluid front is not sufficiently advanced compared to the target fluid front, and decreasing values at points where the injected fluid front overshoots where the target fluid front; determining whether the deviation is within a predetermined convergence value; responsive to a determination that the deviation is not within the predetermined convergence value, repeating the loop; and responsive to a determination that the deviation is within the predetermined convergence value, exiting the loop and determining the flow control device properties for the injection well that yields the prescribed accumulated injection profile along the production well.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

The invention claimed is:

1. A computer implemented method for determining flow control device properties of flow control devices along an injection well within a formation that yield a prescribed accumulated injection profile along a production well within the formation, the method comprising:
   initializing, by a computer system, a flow control device distribution function to have a uniform flow control device distribution profile;
   simulating, by the computer system, propagation of an injected fluid front from the injection well to the production well, based on the initialized flow control device distribution function, the injected fluid front representing a volume of fluid to be injected from the injection well into a reservoir area of the formation between the injection well and the production well;
   determining, using the flow control device distribution function, a distribution of flow in the injection well and a location of the injected fluid front when it reaches the production well during the simulation;
   determining a reference location along a length of the injection well, based on the distribution of flow in the injection well and the location of the injected fluid front, the reference location corresponding to a point along the injected fluid front where the simulated injected fluid front propagation is determined to be at a minimum;
   adjusting the flow control device distribution function by decreasing values of the flow control device distribution function at points where the injected fluid front overshoots a target fluid front;
   determining whether a deviation between shape of the injected fluid front according to the adjusted flow control device distribution function and the prescribed accumulated injection profile is within a predetermined convergence value;
   when the deviation is determined not to be within the predetermined convergence value, repeating the simulation of the injected fluid front propagation and the adjustment of the flow control device distribution function until the deviation is determined to be within the predetermined convergence range;
   when the deviation is determined to be within the predetermined convergence value, determining the flow control device properties of the flow control devices along the injection well that yield the prescribed accumulated injection profile along the production well; and
   injecting the volume of fluid into the reservoir area of the formation using the flow control devices along the injection well according to the determined flow control device properties that yield the prescribed accumulated injection profile along the production well.

2. The computer implemented method of claim 1, wherein the reference location along the injection well satisfies a condition of having a minimum ratio between a current fluid injection front and a target fluid injection front.

3. The computer implemented method of claim 1, wherein adjusting the flow control device distribution function further comprises:
   increasing values of the flow control device distribution function at points where the injected fluid front is not sufficiently advanced compared to the target fluid front.

4. The computer implemented method of claim 1, wherein the predetermined convergence value is $10^{-5}$ of the desired volume of injection fluid.

5. The computer implemented method of claim 1, wherein the reference location along the length of the injection well does not change during subsequent iterations of the simulation of the injected fluid front propagation and the adjustment of the flow control device distribution function.

6. The computer implemented method of claim 1, wherein the prescribed accumulated injection profile is non-uniform.

7. The computer implemented method of claim 1, wherein the prescribed accumulated injection profile is uniform.

8. The computer implemented method of claim 1, wherein determining the flow control device properties includes determining various hole diameters of the flow control devices along the length of the injection well.

9. The computer implemented method of claim 1, wherein determining the flow control device properties includes determining a distance distribution of the flow control devices along the length of the injection well.

10. A system, comprising:
at least one processor; and
at least one memory coupled to the at least one processor and storing processor executable instructions which, when executed by the at least one processor, cause the at least one processor to perform a plurality of functions, including functions for:
initializing a flow control device distribution function to have a uniform flow control device distribution profile;
simulating propagation of an injected fluid front from an injection well to a production well within a formation, based on the initialized flow control device distribution function, the injected fluid front representing a volume of fluid to be injected from the injection well into a reservoir area of the formation between the injection well and the production well;
determining, using the flow control device distribution function, a distribution of flow in the injection well and a location of the injected fluid front when it reaches the production well during the simulation;
determining a reference location along a length of the injection well, based on the distribution of flow in the injection well and the location of the injected fluid front, the reference location corresponding to a point along the injected fluid front where the simulated injected fluid front propagation is determined to be at a minimum;
adjusting the flow control device distribution function by decreasing values of the flow control device distribution function at points where the injected fluid front overshoots a target fluid front;
determining whether a deviation between a shape of the injected fluid front according to the adjusted flow control device distribution function and a prescribed accumulated injection profile is within a predetermined convergence value;
when the deviation is determined not to be within the predetermined convergence value, repeating the simulation of the injected fluid front propagation and the adjustment of the flow control device distribution function until the deviation is determined to be within the predetermined convergence range;
when the deviation is determined to be within the predetermined convergence value, determining properties of flow control devices along the injection well that yield the prescribed accumulated injection profile along the production well; and
injecting the volume of fluid into the reservoir area of the formation using the flow control devices along the injection well according to the determined flow control device properties that yield the prescribed accumulated injection profile along the production well.

11. The system of claim 10, wherein the reference location along the injection well satisfies a condition of having a minimum ratio between a current fluid injection front and a target fluid injection front.

12. The system of claim 10, wherein adjusting the flow control device distribution function further comprises:
increasing values of the flow control device distribution function at points where the injected fluid front is not sufficiently advanced compared to the target fluid front.

13. The system of claim 10, wherein the predetermined convergence value is $10^{-5}$ of the desired volume of injection fluid.

14. The system of claim 10, wherein the reference location along the length of the injection well does not change during subsequent iterations of the simulation of the injected fluid front propagation and the adjustment of the flow control device distribution function.

15. The system of claim 10, wherein the prescribed accumulated injection profile is non-uniform.

16. The system of claim 10, wherein the prescribed accumulated injection profile is uniform.

17. The system of claim 10, wherein determining the flow control device properties includes determining various hole diameters of the flow control devices along the length of the injection well.

18. The system of claim 10, wherein determining the flow control device properties includes determining a distance distribution of the flow control devices along the length of the injection well.

19. A non-transitory computer readable medium comprising computer executable instructions which, when executed by a computer, causes the computer to perform operations comprising:
initializing a flow control device distribution function to have a uniform flow control device distribution profile;
simulating propagation of an injected fluid front from an injection well to a production well within a formation, based on the initialized flow control device distribution function, the injected fluid front representing a volume of fluid to be injected from the injection well into a reservoir area of the formation between the injection well and the production well;
determining, using the flow control device distribution function, a distribution of flow in the injected well and a location of the injected fluid front when it reaches the production well during the simulation;
determining a reference location along a length of the injection well, based on the distribution of flow in the injection well and the location of the injected fluid front, the reference location corresponding to a point along the injected fluid front where the simulated injected fluid front propagation is determined to be at a minimum;
adjusting the flow control device distribution function by decreasing values of the flow control device distribution function at points where the injected fluid front overshoots a target fluid front;
determining whether a deviation between a shape of the injected fluid front according to the adjusted flow control device distribution function and a prescribed accumulated injection profile is within a predetermined convergence value;

when the deviation is determined not to be within the predetermined convergence value, repeating the simulation of the injected fluid front propagation and the adjustment of the flow control device distribution function until the deviation is determined to be within the predetermined convergence range;

when the deviation is determined to be within the predetermined convergence value, determining properties of flow control devices along the injection well that yield the prescribed accumulated injection profile along the production well; and injecting the volume of fluid into the reservoir area of the formation using the flow control devices along the injection well according to the determined flow control device properties that yield the prescribed accumulated injection profile along the production well.

20. The non-transitory computer readable medium of claim 19, wherein determining flow control device properties includes determining hole diameters for the flow control devices along the length of the injection well.

* * * * *